Oct. 22, 1963

J. J. ECKL 3,108,258

ELECTRONIC CIRCUIT

Filed July 12, 1960

INVENTOR.

JAMES J. ECKL

BY

William H. Schmeling 3,108,258
ELECTRONIC CIRCUIT
James J. Eckl, Milwaukee, Wis., assignor to Square D Company, Detroit, Mich., a corporation of Michigan
Filed July 12, 1960, Ser. No. 42,256
11 Claims. (Cl. 340—174)

Figures 1, 2, 3, 4:
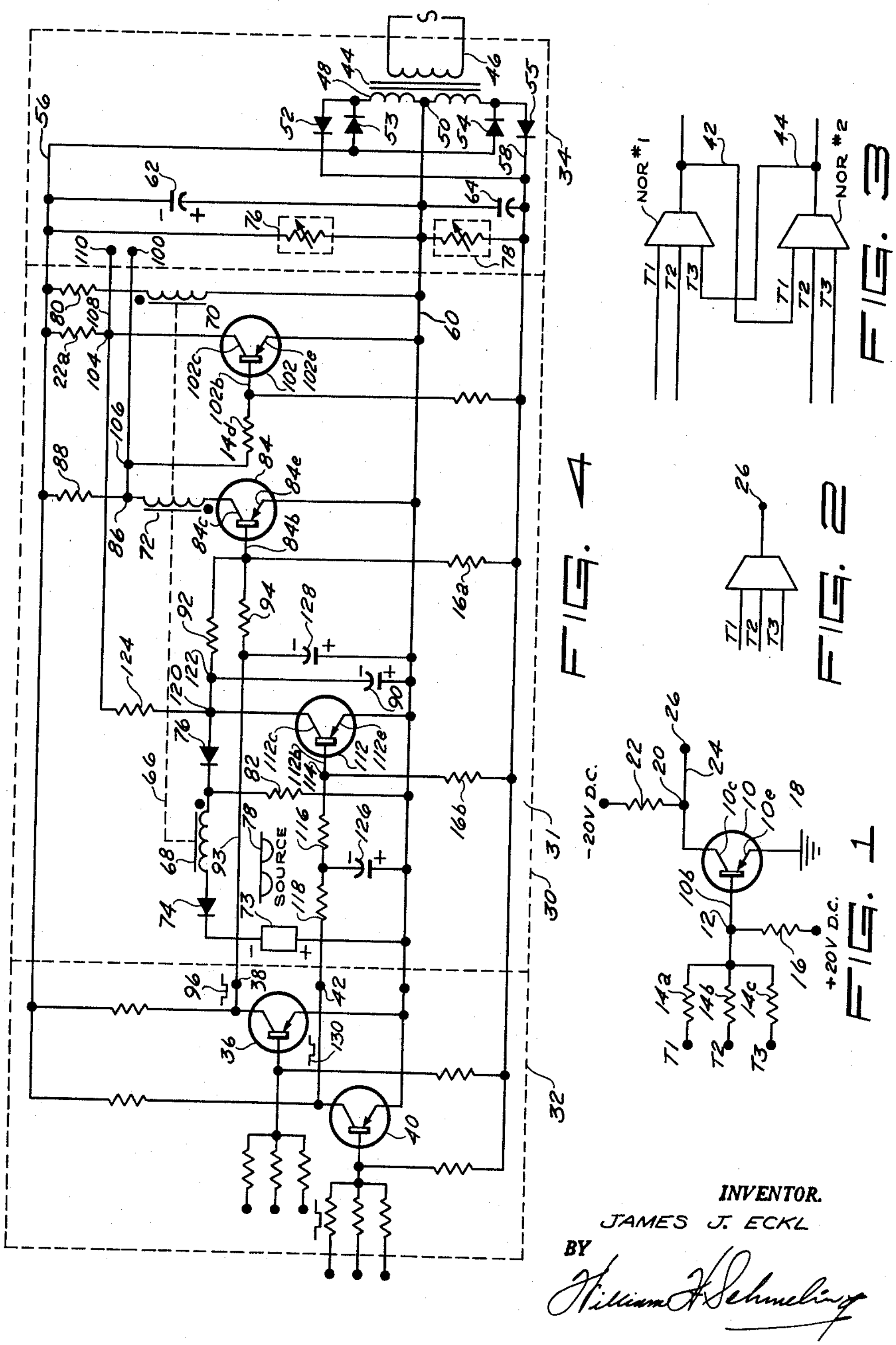

This invention relates to electronic circuits and is more particularly concerned with a retentive memory circuit for use in logic systems.

While the retentive or permanent memory according to the present invention is suitable for use with a wide variety of logic components as used in logic systems, it is particularly adapted for use as a component in a "Nor" logic system which employs a basic well known "Nor" circuit as the decision rendering element in the logic system.

Frequently, in logic circuits, it is necessary to employ memories to retain for indeterminate intervals and subsequently transmit a corresponding or dependent signal in the logic systems. It is well known that logic circuits, if they are to be commercially acceptable and operate satisfactorily, must employ components which have rapid switching speeds and operate with signals of short duration. While certain of the basic components, i.e., magnetic amplifier type switch units, as used in certain logic systems, inherently may provide a retentive memory function, transistorized "Nor" units, inherently do not have retentive memory capabilites. One form of a transistor "Nor" unit memory may consist of a pair of "Nor" units connected to provide a memory function in the logic system. This basic primitive "Nor" memory system also will be hereinafter described. The basic "Nor" memory circuit, as well as some of the other well known logic devices, inherently passes the disadvantage that they will fail or will not faithfully retain a signal impressed thereon in the event of failure or interruption of power to the logic system. It may be said that on these occasions the basic memories will have amnesia.

The memory circuit according to the present invention overcomes the deficiencies and will, once a signal is impressed thereon, retain the signal regardless of power failures or interruptions and will, upon resumption of the power to the logic circuit, return the memories to the state in which they existed before the power interruption. The circuit according to the present invention basically employs five features among which are a half wave magnetic amplifier circuit, at least two transistor "Nor" circuits, capacitor discharge transistor circuits and feedback and delay circuits which will permit proper triggering of the magnetic amplifier when the memory is triggered from one bistable state to a second bistable state.

It is an object therefore of the present invention to provide a retentive or a permanent memory for use in logic systems.

It is another object of the present invention to provide a retentive memory for use in logic systems which memory will operate independently of power supply failures.

A further object of the present invention is to provide a bistable retentive memory unit for logic systems which memory will be unaffected by interruptions of the supply voltage.

Another object of the present invention is to provide a retentive memory unit which is particularly suited for use in transistorized logic systems, which memory unit will not have amnesia upon interruptions of the power supply to the memory.

Further objects and features of the invention will be readily apparent to those skilled in the art from the specification and appended drawing illustrating certain preferred embodiments in which:

FIG. 1 schematically shows a basic "Nor" transistor circuit.

FIG. 2 diagrammatically shows a "Nor" circuit symbol.

FIG. 3 diagrammatically shows a "Nor" memory circuit employing the "Nor" symbol of FIG. 2.

FIG. 4 schematically shows a circuit diagram for a retentive or permanent memory according to the present invention.

In the drawings, in FIG. 1 particularly, a basic "Nor" circuit is shown. These basic circuits are well known. An example thereof can be found on page 131 of the 4th Edition of the Transistor Manual as published by the General Electric Company in 1959. The basic "Nor" circuit as shown employs a p-n-p type transistor 10 having a base 10*b*, an emitter 10*e* and a collector 10*c*. The base is connected through a junction 12 and resistors 14*a*, 14*b* and 14*c* to input terminals T1, T2 and T3 respectively. A positive terminal of a 20 volt D.C. source, not shown, is connected through a bias resistor 16 to junction 12. The 20 volt D.C. source conventionally has its negative terminal connected to ground 18. The emitter 10*e* is connected to a ground 18. The collector 10*c* is connected through a junction 20 and a resistor 22 to the negative terminal of a 20 volt D.C. source, not shown, which has its positive terminal connected to ground 18. Also connected to the junction 20 is a lead 24 which constitutes an output lead and is connected to an output terminal 26 of the "Nor" logic circuit.

In the circuit shown in FIG. 1, when a negative voltage pulse of sufficient magnitude is applied to any one of the input terminals T1, T2 and T3, the transistor 10 will become conductive. The negative voltage pulse may originate from a source, not shown, which has its positive terminal connected to ground 18 to cause the normal positive bias at junction 12 to be overcome and cause the base 10*b* to become negative relative to the emitter 10*e*. Normally, when a negative voltage pulse is not impressed on T1 or T2 or T3, the base 10*b* will be biased positive by the positive 20 volts through resistor 16. When this condition exists, the transistor 10 will be nonconductive, that is, there will be no emitter 10*e* to collector 10*c* current flow and the potential between junction 20 or lead 24 and ground 18 will be a negative 20 volts. However, when the transistor 10 is rendered conductive by a negative pulse applied to either T1 or T2 or T3, then junction 20 will become less negative and approach the zero potential of the ground.

From the above it is clearly apparent that if an input signal, i.e., a negative voltage, is present at T1 or T2 or T3, then no signal will be present at the output terminal 26 and if no signal is present at T1 or T2 or T3, then a signal will be present at terminal 26. Stated in another manner, a signal at T1 OR T2 OR T3 will NOT give a signal at terminal 26. Therefore the circuit is termed a NOR circuit, which is a contracted form of the terms "NOT" and "OR."

If the absence of an input at terminals T1, T2 or T3 is considered as a "0" and the presence of an input at terminals T1, T2 or T3, i.e., a negative voltage signal, is considered a "1" and the absence and presence of a signal at the output terminal 26 is respectively considered a "0" and "1," then it can be seen that an input "0" to T1, T2 or T3 will result in an output of "1" at the terminal 26 and an input of "1" at the terminals T1, T2 or T3 will result in an output of "0" at terminal 26. In this respect the "Nor" operates as an inverter.

The "Nor" circuit above described in connection with FIG. 1 is diagrammatically shown in FIG. 2, and may be connected with an additional "Nor" to provide a memory as shown in FIG. 3 wherein a pair of "Nors" are shown. It will be seen that an input of "1" at T1 in "Nor #1" will provide an output of "0" at a lead 42, which output is impressed at the terminal T1 of the "Nor #2". An input of "0" at the terminal T1 of the "Nor #2" will cause an output of "1" to be impressed at a lead 44 which in turn is transmitted to the "Nor #1" input T3 to cause "Nor #1" to retain the state caused by the original "1" input at T1. When the unit is to reset, an input of "1" at the terminal T3 of the "Nor #2" will switch "Nor #2" and cause the output at lead 44 to change from a "1" to a "0" to reset the "Nor #1" to its original state before the input of "1" was impressed on the terminal T1. It will be seen from the above that should the power to "Nor #1" and "Nor #2" be interrupted, then upon resumption of power and in the absence of an external signal to both "Nors," either of the "Nors" could supply an input to the other and thus make it impossible to predict the state to which the "Nor" memory shown in FIG. 3 will return. The circuit as shown in FIG. 4 overcomes this difficulty and will now be described.

In FIG. 4, the portion included within the dotted rectangle formed by lines 30 constitutes a memory circuit 31 according to the present invention. The circuit shown in the dotted rectangle 32 basically may be regarded as a signal input section and the circuitry shown in the dotted rectangle 34 may be regarded as a power source section. It will be recognized that the circuit shown in the rectangular area 32 is formed of two basic "Nor" circuits above described wherein the circuit associated with a transistor 36 constitutes one "Nor" and provides an output at a terminal 38 of the memory circuit 31 and the circuit connected with a transistor 40 constitutes a second "Nor" which provides a signal to a terminal 42 of the memory circuit 31.

The power supply included in a rectangle formed by dotted lines 34 for the memory circuit 31 and the "Nor" circuits associated with transistors 36 and 40 includes a transformer 44 having a primary winding 46 connected to a suitable outside source and a secondary winding 48, which is center tapped at 50. The output terminals of the secondary winding 48 are connected through suitable diodes 52, 53, 54 and 55 to provide a full wave rectified D.C. current at leads 56 and 58 which are respectively 20 volts negative and 20 volts positive relative to the ground lead 60. The output across lead 56 to 60 and 58 to 60 are filtered by capacitors 62 and 64, respectively. Also connected between leads 56 and 60 and 58 and 60, respectively, are diagrammatically shown variable loads 76 and 78 which are used to designate other loads such as other "Nor" circuits and memory circuits, etc., which may be connected in the logic system across the output leads 56 and 58 to ground 60.

The understanding of the memory circuit 31 included in the dotted rectangle 30 will be facilitated if the circuit is considered to have five features, all of which operate in combination with each other to produce the results indicated:

(1) A half wave magnetic amplifier circuit;
(2) Two transistor "Nor" circuits;

(3) A capacitor discharge transistor switch;
(4) A capacitor delay circuit; and,
(5) A feedback circuit.

The half wave magnetic amplifier circuit includes a magnetic amplifier preferably having a toridal core of bistable magnetic material indicated by the dotted line 66 on which is wound a gate winding 68, a bias winding 70 and a control winding 72. The gate winding circuit supplied with a time varying input voltage from a source 73 which may consist of a secondary winding on transformer 44. Connected in series with the source 73 and the gate winding 68 are a pair of diodes 74 and 76 which will rectify the alternating current output of the source 73 so the gate winding is energized by a series of direct current pulsations as represented by the wave shape 78. The bias winding 70 and the control winding 72 are used to control the saturation of the core 66 by the time varying input voltage from source 73. The windings 68, 70 and 72 are arranged on the core so that the flux induced therein by the current flowing in the bias winding 70 opposes the flux induced in the core by the gate winding 68. The bias winding 70, connected between lead 60 and lead 56 in series with a resistor 80, is selected so the flux induced by bias winding 70 and the gate winding 68 will not saturate the core 66. A resistor 82 is connected in series with the gate winding 68 and the diode 74 across the terminals of source 73. The diode 74 will permit current flow only in one direction. During periods when the core 66 is unsaturated, a major portion of the output voltage of the source 73 will be impressed across the gate winding 68 because of the large impedance provided by the gate winding during these periods. Therefore the voltage appearing across the resistor 82 will be small when the core is unsaturated.

Connected across between the lead 60 and the negative 20 volt D.C. lead 56 is a transistor 84 having an emitter 84*e*, a collector 84*c* and a base electrode 84*b*. The emitter 84*e* and collector 84*c* are connected in series with the control winding 72, a junction 86, and a resistor 88. It will be seen that when the transistor 84 is rendered conductive by means which will be hereinafter described, the current flow in the winding 72 will simultaneously induce a saturating flux in the core 66 and decrease the negative potential of the junction 86. The flux induced by the control winding 72 opposes the flux of the bias winding 70 and aids the flux induced by the gate winding 68. In the circuit heretofore described, the components thereof are selected so the core 66 will become saturated when current flows in winding 72. When the core 66 is saturated, the impedance of the gate winding is markedly decreased and the voltage drop across the resistor 82 is correspondingly increased. Connected in parallel with the resistor 82 across the output terminals of the source 73 is a capacitor 90 and the diode 76. During the periods when the core 66 is unsaturated, a relatively small charge will be impressed across the capacitor 90 because of the small voltage drop across resistor 82. When core 66 is saturated, the impedance of the gate winding 68 decreases and the voltage drop across the resistor 82 markedly increases and appears as a charge on the capacitor 90. This charge will have the polarity indicated in the drawing. The negative terminal of the capacitor is connected through a current limiting resistor 92 to the base 84*b* of the transistor. The positive terminal of the capacitor 90 is connected to the emitter 84*e* of transistor 84. Thus the charge on capacitor 90 will bias the transistor 84 to conduction to continue the saturating current flow through control winding 72.

The transistor 84, which may be considered as a controlled switch, will be rendered conducting whenever a negative voltage is impressed on its base 84*b*. As previously described, this may be accomplished by charging capacitor 90. The base 84*b* can also be rendered negative relative to emitter 84*e* by a signal which is transmitted to a lead 93 through a current limiting resistance 94. This negative voltage signal preferably has the wave shape as shown by the wave designated by numeral 96. This voltage wave signal 96 should have a duration at least equal to one full cycle of the frequency of the source 73 to assure proper switching of the core 66.

Assuming initially that the transistor 84 is nonconducting and the core 66 is unsaturated, then only a small voltage drop will appear across resistor 82. This small voltage, which is impressed on capacitor 90 through diode 76, is insufficient to cause the transistor 84 to conduct. When a negative voltage pulse 96 is transmitted through lead 93 to the base 84*b*, the transistor 84 conducts current through control winding 72 causing the core 66 to saturate and the capacitor 90 to charge sufficiently to bias the transistor 84 to continue its conduction. It is to be noted that a removal of the input voltage signal to lead 93 after capacitor 90 is charged will not alter the conducting state of the circuit.

The input signal to lead 93 may be provided by any well known device, such as limit switches, etc., or by a "Nor" circuit, such as shown in connection with transistor 36. Because of the inverter action of the "Nor" circuit, normally a "1" input signal is impressed on the base of transistor 36 so a "0" signal is impressed on the base of transistor 84. Thus transistor 84 is biased against conduction. A "0" signal impressed on the inputs of the "Nor" associated with transistor 36 will cause a "1" signal to appear on base 84*b* to cause transistor 84 to conduct.

The retentive action of the retentive memory circuit is provided by the saturation of the iron in core 66 and if power is interrupted while the core 66 is saturated, the residual flux density stored in the core will return the memory to the state in which it existed before the power was interrupted. When power is restored, current flow in the bias winding and the gate winding 68 will begin to flow simultaneously. The residual flux density in the core, however, will decrease the impedance of the gate winding so the capacitor 90 charges and locks the memory circuit in the saturated position. When the core is unsaturated, the residual flux density will be absent and the impedance of the gate winding will be large and the capacitor 90 will not charge to a voltage sufficient to overcome the bias on the base of the transistor provided by the 20 volt supply present at lead 58 which is transmitted through a bias resistor 16*a*.

Additionally, the transistor 84 provides an output signal. It is to be noted that the junction 86, prior to the conduction of the transistor 84, will be at a potential which approaches the −20 volt bus on lead 56. This may be considered as a "1" signal as previously described in connection with the basic "Nor" circuit. When transistor 84 is rendered conductive, the potential at junction 86 approaches the potential of lead 60 to provide an output signal of "0," as previously described. The junction 86 is connected through a junction 106 to an output terminal 100 to provide one of the outputs for the memory circuit. Another output, which is the complement of the output provided at terminal 100, is provided by a "Nor" circuit which is associated with the transistor 102 which has a base 102*b*, an emitter 102*e* and a collector 102*c*. The emitter of the transistor is connected to the "0" volt lead 60 and the collector 102*c* is connected through a junction 104 and a resistor 22*a* to the negative 20 volt lead 56. The base 102*b* is connected through a current limiting resistor 14*d* to the junction 106. Therefore, when the transistor 84 is rendered conductive in response to a "1" signal on its base, the transistor 102 will have a "0" signal impressed on its base to be rendered nonconductive and provide a "1" signal at junction 104 which is connected through a lead 108 to an output terminal 110 of the memory system. Also, when the transistor 84 is rendered nonconductive in response to a "0" signal on its base, the transistor 102 will be rendered conductive and provide a "0" signal at its output terminal 110. Therefore it is clear that the signal appearing at terminal 110 will be the same as is impressed on the base 84*b* of transistor 84, the purpose thereof which will be hereinafter described.

The circuit shown in FIG. 4 also includes a transistor 112 having a base 112*b*, an emitter 112*e* and a collector 112*c*. The base 112*b* is connected through a junction 114 and series connected resistors 116 and 118 to the terminal 42 which in turn is connected to the output terminal of a "Nor" circuit associated with transistor 40. The collector 112*c* of the transistor is connected through a junction 120 and a junction 122 to the negative plate of the capacitor 90. The emitter 112*e* is connected to the positive plate of capacitor 90. The transistor 112 acts as capacitor discharge transistor switch and when the transistor 112 is rendered conductive, it will provide a discharge path for the capacitor 90. The transistor 112 conducts in response to a negative voltage signal on its base 112*b* which is sufficient to overcome the bias from the positive 20 volt lead through resistance 16*b*. The base of transistor 112 is rendered negative to cause the conduction thereof in response to "0" input signal which is impressed on the "Nor" circuit associated with the transistor 40. The signal to the base 112*b*, which is diagrammatically illustrated by the numeral 130, preferably has a time duration equal to one full cycle of the frequency of the source 73. This will permit proper switching of the magnetic circuits associated with the memory. As previously pointed out, when the capacitor 90 is discharged and a signal on lead 93 is absent, the bias provided through the resistance 16*a* to the base 84*b* of the transistor 84 will render the resistor 84 nonconducting. Thus the flow of current through the control winding 72 will be blocked and the core 66 will be desaturated. The time interval required to discharge the capacitor 90 in event of power failure or interruption is increased by a feedback circuit. The feedback circuit includes a resistance 124 which has one end connected to the junction 120 and the other end thereof connected to the junction 104. As previously indicated, the junction 104 and the base 84*b* of transistor 84 continuously will have the same signal level impressed thereon. When the transistor 84 is rendered conducting in response to a negative charge on its base, transistor 102 will be non-conducting and a negative potential will be impressed at junction 104. A portion of this negative potential, depending upon the voltage dividing action of resistances 22*a* and resistance 124, will be impressed through the junction 120 across the capacitor 90. During periods when junction 104 has a negative or a "1" signal impressed thereon, in event of power failure during these periods, the capacitance of the supply source as provided by capacitor 62 will feed a charging current through the feedback circuit to prolong the discharge time required to discharge the capacitor 90 through the transistor 112. Thus the feedback circuit including resistor 124 will delay the discharge of capacitor 90 when the power to the memory is interrupted. Thus the capacitor 90 will discharge the memory circuit at substantially the same rate as the supply voltage to the memory and prevent the transistors 112 and 84 from changing their conductive states prematurely which would otherwise cause a false switching of the memory.

A capacitor 126 is connected between resistors 116 and 118 and lead 60 and likewise a capacitor 128 is connected to lead 93 between resistance 94 and junction 38 and lead 60. The capacitors 126 and 128 respectively are charged by the input signals 130 and 96 and will delay the transmission of negative input signals 130 and 96 to the bases associated with transistors 112 and 84. Thus the capacitors 126 and 128 will permit the transistors 112 and 84 to conduct only when the input signals are of sufficient time duration and magnitude to permit proper switching of the core 66 and hence proper operation of the memory.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A retentive memory logic circuit comprising a core of bistable magnetic material, a gate winding wound on the core for inducing a saturating magnetic flux in the core when the gate winding is energized, a bias winding wound on the core for inducing a desaturating flux in the core when the gate winding is energized, a control winding wound on the core for inducing a saturating flux in the core when the bias winding is energized, said windings being wound so the core is saturated with flux when all of the windings are energized and is desaturated when only the control winding is de-energized, a source for energizing all of the windings, a first means including an electronic switch for controlling the energization of the control winding from the source and thereby respectively the saturation and desaturation of the core, second means in circuit with the source and gate winding responsive to an impedance change across the gate winding caused by the changes in saturation of the core, a third means independent of the core for controlling the conduction of the electronic switch, and fourth means in circuit with the first and second means for causing conduction and non-conduction of the electronic switch whenever the core is respectively saturated and desaturated to render the operation of the memory circuit independent of source failures.

2. The retentive memory logic circuit as recited in claim 1 wherein the second means includes a resistor and a fourth means includes a capacitor connected across the resistor and connected in series with the source and gate winding.

3. The retentive memory logic circuit as recited in claim 2 wherein the capacitor is connected to a control electrode of the electronic switch of the first means for rendering the switch conductive whenever the core is saturated.

4. The retentive memory logic circuit as recited in claim 2 including a second electronic switch having a control electrode connected to an external signal source arranged to provide a discharge circuit for the capacitor in response to a signal from the external source.

5. The retentive memory logic circuit as recited in claim 4 wherein the electronic switch of the first means is connected to the control electrode of a third electronic switch to control the conduction of the third switch inversely with the conduction of the first mentioned electronic switch.

6. The retentive memory logic circuit as recited in claim 5 wherein a feedback circuit is connected between the third electronic switch and the capacitor to delay the discharge of the capacitor by the second electronic switch.

7. The retentive memory logic circuit as recited in claim 1 wherein the third means includes an additional electronic switch having a control electrode connected to have an external signal impressed thereon.

8. The combination as recited in claim 7 wherein a capacitor is connected between the additional switch and the electronic switch of the first means for delaying the response of the electronic switch of the first means to an external signal applied to the additional electronic switch.

9. A retentive memory logic circuit, comprising a magnetic storage element having a bistable magnetic core with a gate, a bias and a control winding thereon each capable of inducing a magnetic flux in the core, said windings being wound on the core so the flux induced by the gate winding opposes the flux induced by the bias winding and aids the flux induced by the control winding and the core is magnetically saturated when all of the windings are energized and desaturated when the control winding is de-energized, a current source connected to energize all of the windings, means including an electronic switch for controlling the energization of the control winding, said switch having a control electrode to selectively render the electronic switch conductive and non conductive and thereby selectively change the saturation and desaturation of the core, a second means in circuit with the source and gate winding responsive to an impedance change across the gate winding caused by the changes in saturation of the core, said second means including a circuit having capacitor connected to the control electrode to render the switch means conducting when the core is saturated and non conductive when the core is desaturated to render the memory circuit independent of failures of the current source, and a means including a second electronic switch connected to provide a discharge circuit for the capacitor and to render the first electronic switch non conductive independently of the saturation of the core.

10. A retentive memory logic circuit comprising; a magnet storage element having a core of bistable magnetizable material with a gate and a bias and a control winding thereon each capable of inducing a magnetic flux in the core, said windings being wound so the flux induced by the gate winding opposes the flux induced by the bias winding and aids the flux induced by the control winding and the core is magnetically saturated when all of the windings are energized and desaturated when the control winding is de-energized, a current source connected to continuously energize the gate and bias windings, an impedance and capacitance connected in circuit with the gate winding and source means for charging the capacitor when the core is saturated, an electronic switch in circuit with the control winding for controlling the energization of the control winding, said switch having a control electrode for rendering the switch conductive and non conductive, means connected to the control electrode for rendering the switch conductive and thereby energizing the control winding for saturating the core and charging the capacitor, and means connecting the control electrode to the capacitor for causing the switch to be conductive when the capacitor is charged, and a second electronic switch having a control electrode connected to an external signal source and principal electrodes connected to provide a discharge circuit for the capacitor when the second electronic switch is rendered conductive in response to a signal from the external source.

11. A retentive memory logic circuit comprising; a magnetic storage element having a bistable magnetic core with a gate, a bias and a control winding wound on the core and each capable of inducing a magnetic flux in the core, said windings being wound so the flux induced by the gate winding opposes the flux induced by the bias winding and aids the flux induced by the control winding and the core is saturated with flux when all of the windings are energized and is desaturated when only the control winding is de-energized, a current source connected to energize all of the windings, a first electronic switch having a pair of principal electrodes and a control electrode with the principal electrodes connected in series circuit with the source and control winding for energizing the control winding whenever the first switch is rendered conductive in response to a signal to the control electrode, means including a second electronic switch for transmitting an external signal to the control electrode of the first switch, means for delaying the signal transmitted between the second and first switches, means including a resistance and a capacitance connected in parallel with each other and in series with the gate winding and source responsive to an impedance change of the gate winding caused by changes in saturation of the core and for charging the capacitor whereby the capacitor is charged when the core is saturated, circuit means connecting the capacitor to the control electrode of the first switch to render the first switch conductive when the capacitor is charged, a third electronic switch having a pair of principal electrodes and a control electrode arranged for controlling the conduction of the third switch with the principal electrodes connected to provide a discharge circuit for the capacitor, a means including a fourth electronic switch having principal electrodes connected to the control electrode of the third switch and a control electrode responsive to an external signal for transmitting the external signal to the third switch, a means for delaying the transmitted external signal to the third switch control electrode, a fifth electronic switch having a pair of principal electrodes and a control electrode for controlling the conduction of the switch, said fifth switch control electrode being connected with one of the principal electrodes of the first switch for controlling the conduction of the fifth switch inversely to the conduction of the first switch, means connected to the principal electrodes of the first and fifth switches to furnish an output signal, and a feedback signal means connected between one of the principal electrodes of the fifth switch and capacitor for delaying the discharge of the capacitor by the third switch.

References Cited in the file of this patent

UNITED STATES PATENTS

| | | |
|---|---|---|
| 2,903,601 | Schneider | Sept. 8, 1959 |
| 2,946,896 | Alizon et al. | July 26, 1960 |
| 2,955,211 | Ostroff | Oct. 4, 1960 |
| 2,956,168 | Pinckaers | Oct. 11, 1960 |